United States Patent
Kim et al.

(10) Patent No.: US 11,040,723 B2
(45) Date of Patent: Jun. 22, 2021

(54) VEHICLE AND METHOD OF CONTROLLING THE SAME

(71) Applicants: Hyundai Motor Company, Seoul (KR); Kia Motors Corporation, Seoul (KR)

(72) Inventors: Sang Joon Kim, Seoul (KR); Young Chul Kim, Gyeonggi-Do (KR); Leehyoung Cho, Gyeonggi-Do (KR); Dong ho Yang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 16/035,646

(22) Filed: Jul. 15, 2018

(65) Prior Publication Data

US 2019/0193750 A1 Jun. 27, 2019

(30) Foreign Application Priority Data

Dec. 21, 2017 (KR) ........................ 10-2017-0176678

(51) Int. Cl.
| | |
|---|---|
| *B60W 10/00* | (2006.01) |
| *B60W 50/08* | (2020.01) |
| *B60W 20/15* | (2016.01) |
| *B60W 30/182* | (2020.01) |
| *B60W 40/09* | (2012.01) |

(52) U.S. Cl.
CPC .......... *B60W 50/082* (2013.01); *B60W 20/15* (2016.01); *B60W 30/182* (2013.01); *B60W 40/09* (2013.01); *B60W 2556/45* (2020.02)

(58) Field of Classification Search
None
See application file for complete search history.

(56) References Cited

U.S. PATENT DOCUMENTS

| 5,483,446 | A | * | 1/1996 | Momose | ................. F16H 59/00 701/1 |
|---|---|---|---|---|---|
| 5,941,793 | A | * | 8/1999 | Ito | ....................... F16H 61/0213 477/120 |
| 8,160,781 | B2 | * | 4/2012 | Naono | ................. G05B 13/024 701/48 |
| 8,457,873 | B2 | | 6/2013 | Hyde et al. | |
| 8,577,526 | B2 | * | 11/2013 | Jinno | ................... B60L 15/2045 701/22 |

(Continued)

FOREIGN PATENT DOCUMENTS

| JP | 2008-220004 A | 9/2008 |
|---|---|---|
| JP | 2013-126788 A | 6/2013 |
| KR | 10-1684541 | 12/2016 |

*Primary Examiner* — Jonathan M Dager
(74) *Attorney, Agent, or Firm* — Mintz Levin Cohn Ferris Glovsky and Popeo, P.C.; Peter F. Corless (57) ABSTRACT

A vehicle can include: a sensing device configured to acquire driving information of the vehicle; and a controller configured to determine whether a current driving mode of the vehicle is changeable based on the driving information, to identify a driving mode among a plurality of driving modes which corresponds to the driving information upon determining that the current driving mode is changeable, and to control an operation of the vehicle so as to change the current driving mode to the identified driving mode.

16 Claims, 6 Drawing Sheets

(56) References Cited

U.S. PATENT DOCUMENTS

| | | | | |
|---|---|---|---|---|
| 8,903,619 B2* | 12/2014 | Noumura | ............... | B60W 40/09 180/197 |
| 9,073,554 B2* | 7/2015 | Hyde | ................. | B60W 50/082 |
| 9,827,993 B2* | 11/2017 | Prokhorov | ........ | B60W 50/0098 |
| 10,053,102 B2* | 8/2018 | Hemes | ................. | B60W 10/06 |
| 2004/0249533 A1* | 12/2004 | Wheals | .................. | B60T 8/172 701/36 |
| 2004/0254047 A1* | 12/2004 | Frank | ................... | B60W 10/08 477/37 |
| 2006/0015234 A1* | 1/2006 | Luh | ..................... | B60W 30/182 701/51 |
| 2007/0288140 A1* | 12/2007 | Wheals | ............... | B60W 30/188 701/36 |
| 2008/0097674 A1* | 4/2008 | Kuwahara | ........... | B60W 30/182 701/51 |
| 2010/0082208 A1* | 4/2010 | Asai | .................... | F16H 61/0213 701/58 |
| 2012/0136506 A1* | 5/2012 | Takeuchi | ............ | B62D 6/007 701/1 |
| 2012/0143399 A1* | 6/2012 | Noumura | .............. | B60W 30/02 701/1 |
| 2012/0221228 A1* | 8/2012 | Noumura | .............. | B60W 30/02 701/110 |
| 2013/0166121 A1* | 6/2013 | Takeuchi | ............... | B60W 10/18 701/22 |
| 2013/0184934 A1* | 7/2013 | Takeuchi | ................ | G06F 17/00 701/37 |
| 2014/0195090 A1* | 7/2014 | Takeuchi | ............... | B60W 10/06 701/22 |
| 2014/0222296 A1* | 8/2014 | Takeuchi | ................ | F16H 59/00 701/48 |
| 2015/0210290 A1* | 7/2015 | Hemes | .................. | B60W 50/12 701/36 |
| 2015/0291027 A1* | 10/2015 | Strasser | ................ | B60K 23/08 701/69 |
| 2016/0006922 A1* | 1/2016 | Boudreau | .............. | H04N 7/185 348/207.1 |
| 2017/0235305 A1* | 8/2017 | Jung | ................... | B60W 50/082 701/23 |
| 2017/0267252 A1* | 9/2017 | Park | ...................... | B60W 50/14 |
| 2018/0009374 A1* | 1/2018 | Kim | ..................... | G03B 21/2013 |
| 2018/0023692 A1* | 1/2018 | Gauthier | ................ | F16H 59/44 701/55 |
| 2018/0137264 A1* | 5/2018 | Kurian | .................. | H04L 67/303 |
| 2018/0141540 A1* | 5/2018 | Kumazaki | ............ | B60W 10/04 |
| 2019/0111925 A1* | 4/2019 | Sata | ...................... | B60W 10/10 |

\* cited by examiner

VEHICLE AND METHOD OF CONTROLLING THE SAME

CROSS-REFERENCE TO RELATED APPLICATION

This application claims the benefit of priority to Korean Patent Application No. 10-2017-0176678, filed on Dec. 21, 2017 in the Korean Intellectual Property Office, the disclosure of which is incorporated herein by reference in its entirety.

BACKGROUND

1. Technical Field

Embodiments of the present disclosure relate to a vehicle and a method of controlling the same, and more particularly, to techniques and devices for automatically changing a driving mode of a hybrid vehicle based on driving information of the vehicle.

2. Description of the Related Art

Hybrid vehicles can use more two or more power sources in contrast with conventional vehicles using one power source (e.g., internal combustion engine vehicles). Hybrid vehicle generally refers to a hybrid electric vehicle driven by an engine and a motor. Hybrid electric vehicles may also be configured to use more than two power sources.

Hybrid vehicles may selectively use the power of the motor or the power of the engine or both in accordance with driving environments. The motor may provide the only power of the vehicle, or the motor and the engine may be simultaneously driven when power of the engine is further required.

Hybrid vehicles generally use a transmission mounted electric device (TMED) type powertrain in which a motor, a transmission, and a drive shaft are connected in series. With a clutch located between the engine and the motor, the hybrid vehicles may operate in an electric vehicle (EV) mode or a hybrid electric vehicle (HEV) mode according to an engagement state of the clutch.

In addition, to meet diverse needs of drivers, such as fuel efficient driving, dynamic driving with relatively low fuel efficiency, and the like, a variety of driving modes have been applied to hybrid vehicles. For example, when a driver activates a "sports mode," the speed of the vehicle may be increased by driving the engine faster or increasing an output torque in accordance with the accelerator pedal.

However, in conventional systems for controlling driving modes, changes in driving modes are inconvenient since the driver needs to set the driving mode manually.

SUMMARY

Therefore, it is an aspect of the present disclosure to provide a dynamic driving experience by automatically changing a driving mode of a vehicle based on driving information.

Additional aspects of the disclosure will be set forth in part in the description which follows and, in part, will be apparent from the description, or may be learned by practice of the disclosure.

In accordance with embodiments of the present disclosure, a vehicle can include: a sensing device configured to acquire driving information of the vehicle; and a controller configured to determine whether a current driving mode of the vehicle is changeable based on the driving information, to identify a driving mode among a plurality of driving modes which corresponds to the driving information upon determining that the current driving mode is changeable, and to control an operation of the vehicle so as to change the current driving mode to the identified driving mode.

The controller may change the current driving mode by controlling at least one of: an engine of the vehicle, a motor of the vehicle, a powertrain of the vehicle, and a transmission of the vehicle.

The controller may change an entry requirement for operation of the engine when the current driving mode is changed from a first mode to a second mode.

The controller may maintain a connection between the engine or an engine clutch of the vehicle and an axle of the vehicle when the current driving mode is changed from a first mode to a second mode.

The controller may lower a gear level of the transmission when the current driving mode is changed from a first mode to a second mode.

The controller may manage a responsiveness of an output torque of the powertrain generated by operation of an accelerator pedal of the vehicle when the driving mode is changed from a first mode to a second mode.

The driving information may include at least one of: road information of a road on which the vehicle travels and traffic information of the road on which the vehicle travels.

The driving information may include at least one of: a traffic volume, a traffic type, a presence of a speed camera, a speed limit of a road on which the vehicle travels, and a current speed of the vehicle.

The controller may change the current driving mode upon receiving a user's approval for changing the current driving mode.

The vehicle may further include an output device configured to provide a user with information indicating a changed driving mode when the driving mode of the vehicle is changed.

The vehicle may further include a display screen configured to display the information indicating the changed driving mode when the current driving mode is changed.

Furthermore, in accordance with embodiments of the present disclosure, a method of controlling a vehicle can include: acquiring, using a sensing device, driving information of the vehicle; determining, by a controller, whether a current driving mode of the vehicle is changeable based on the driving information; identifying, by the controller, a driving mode among a plurality of driving modes which corresponds to the driving information upon determining that the current driving mode is changeable; and controlling, by the controller, an operation of the vehicle so as to change the current driving mode of the vehicle to the identified driving mode.

The controlling of the operation of the vehicle so as to change the current driving mode may include controlling at least one of: an engine of the vehicle, a motor of the vehicle, a powertrain of the vehicle, and a transmission of the vehicle.

The controlling of the operation of the vehicle so as to change the current driving mode may include changing an entry requirement for operation of the engine when the current driving mode is changed from a first mode to a second mode.

The controlling of the operation of the vehicle so as to change the current driving mode may include maintaining a connection between the engine or an engine clutch of the vehicle and an axle of the vehicle when the current driving mode is changed from a first mode to a second mode.

The controlling of the operation of the vehicle so as to change the current driving mode may include lowering a gear level of the transmission when the current driving mode is changed from a first mode to a second mode.

The controlling of the operation of the vehicle so as to change the current driving mode may include managing a responsiveness of an output torque of the powertrain generated by operation of an accelerator pedal of the vehicle when the driving mode is changed from a first mode to a second mode.

The driving information may include at least one of: road information of a road on which the vehicle travels and traffic information of the road on which the vehicle travels.

The driving information may include at least one of: a traffic volume, a traffic type, a presence of a speed camera, a speed limit of the road on which the vehicle travels, and a current speed of the vehicle.

The controlling of the operation of the vehicle so as to change the current driving mode may include changing the current driving upon receiving a user's approval for changing the current driving mode.

The method may further include providing, by an output device, a user with information indicating a changed driving mode.

The output device may include a display screen configured to display the information indicating the changed driving mode when the current driving mode is changed.

BRIEF DESCRIPTION OF THE DRAWINGS

These and/or other aspects of the disclosure will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings, wherein like reference numerals refer to like elements throughout. The embodiments described in the specification and shown in the drawings are only illustrative and are not intended to represent all aspects of the invention, such that various equivalents and modifications may be made without departing from the spirit of the invention.

In addition, the terms used in the present specification are merely used to describe particular embodiments, and are not intended to limit the present disclosure. An expression used in the singular encompasses the expression of the plural, unless it has a clearly different meaning in the context.

In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added. It will be understood that, although the terms "first", "second", etc., may be used herein to describe various elements, these elements should not be limited by these terms.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, the embodiments of the present disclosure will be described in detail by explaining embodiments of the disclosure with reference to the attached drawings. In the drawings, parts unrelated to the descriptions are omitted for clear description of the disclosure.

Hereinafter, a vehicle 100 according to embodiments of the present disclosure will be described based on a hybrid vehicle by way of example. However, the vehicle 100 is not necessarily applied to the hybrid vehicle but may also be applied to any other type of vehicles.

Figure 1:
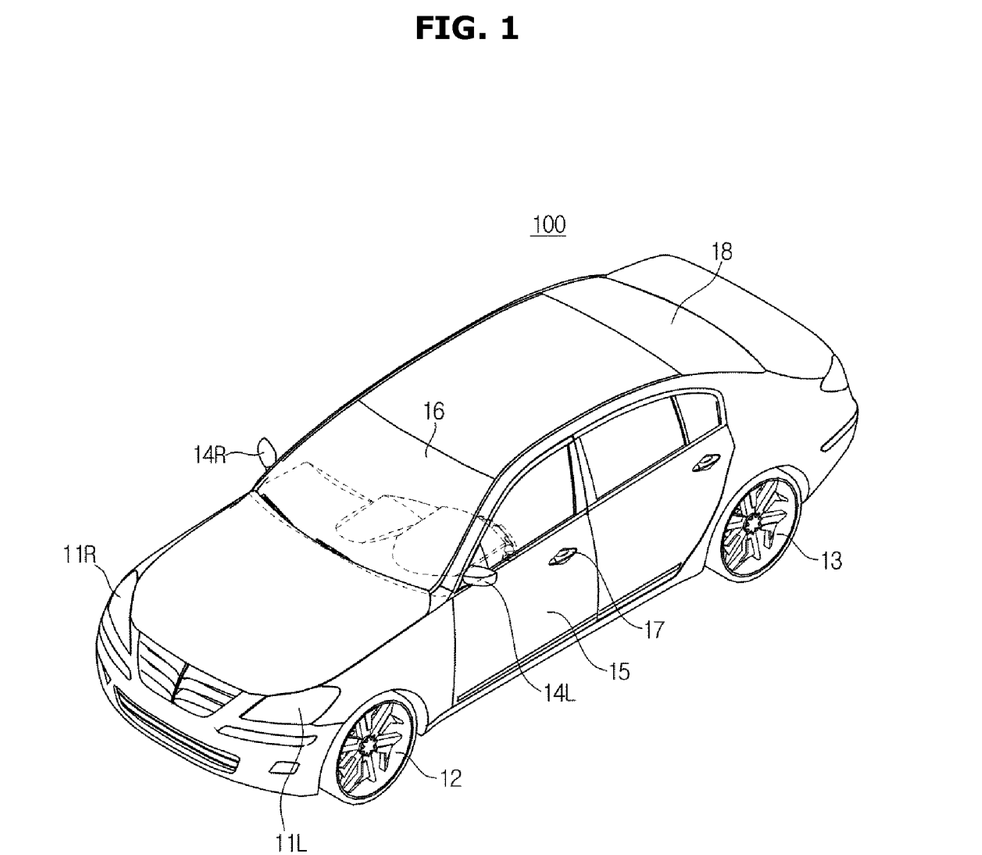
FIG. 1 is an exterior view of a vehicle according to embodiments of the present disclosure.
Figure 2:
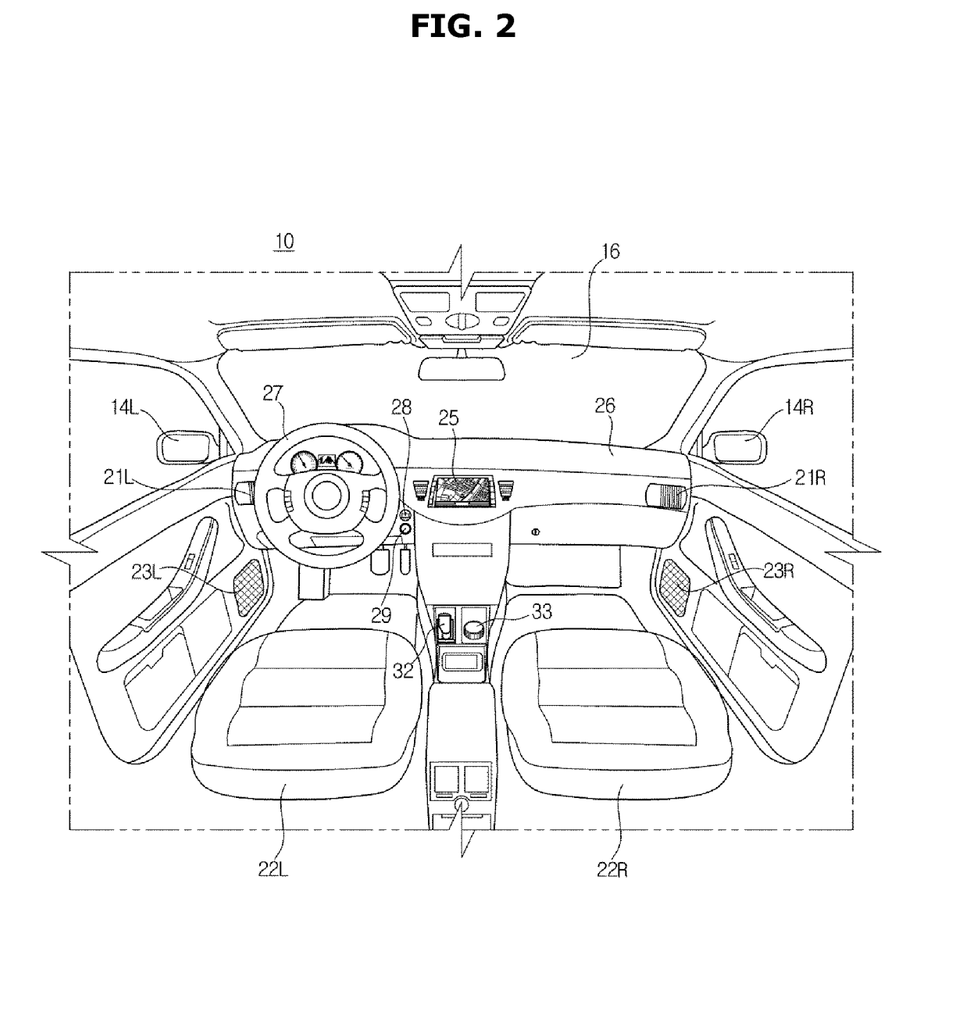
FIG. 2 is an interior view of the vehicle of FIG. 1.

FIG. 1 is an exterior view of a vehicle 100 according to embodiments of the present disclosure. FIG. 2 is an interior view of the vehicle 100. Hereinafter, the drawings will be synthetically described to avoid repeated descriptions.

As shown in FIG. 1, the exterior of the vehicle 100 according to embodiments of the present disclosure may include wheels 12 and 13 configured to move the vehicle 100, doors 15 configured to shield the inside of the vehicle 100 from the outside, a front glass 16 configured to provide a user in the vehicle 100 with views in front of the vehicle 100, and side mirrors 14L and 14R configured to provide the user with views behind the vehicle 100, as is generally understood in the art.

The wheels 12 and 13 include front wheels 12 located at front portions of the vehicle 100 and rear wheels 13 located at rear portions of the vehicle 100. Although not shown in the drawing, the vehicle 100 may include a transmission 140 configured to convert the power to a required rotational force in accordance with a speed and transmit the converted power, a motor 150 configured to provide the power and operate as a power generator when braking to generate electric energy, a battery 160 configured to store electric energy, an engine 180 configured to generate power by burning a fuel, a hybrid starter generator (HSG) 170 configured to generate electric energy by starting the engine or operating as a power generator powered by the engine.

The doors 15 are pivotally coupled to the vehicle 100 at left and right sides and a driver or a passenger may get into the vehicle 100 by opening the doors 15 and the inside of the vehicle 100 may be shielded from the outside by closing the doors 15. In addition, handles 17 to open or close the doors 15 may be provided at the exterior of the vehicle 100.

The front glass 16 is located at a front upper portion of a body to allow a user in the vehicle 100 to acquire visual information of views in front of the vehicle 100 and a rear glass 18 is located at a rear upper portion of the body to allow the user in the vehicle 100 to acquire visual information of views behind the vehicle 100.

Also, the side mirrors 14L and 14R include a left side mirror 14L located on the left side of the vehicle 100 and a right side mirror 14R located on the right side of the vehicle 100 for assisting the user inside the vehicle 100 to acquire visual information of views beside and behind the vehicle 100.

In addition, the vehicle 100 may be provided with headlights 11L and 11R installed at left and right portions and configured to obtain a view in front of the vehicle 100.

In addition, the vehicle 100 may further include a sensing device configured to sense obstacles or another vehicle beside or behind the vehicle 100. The sensing device may include a proximity sensor, a rain sensor configured to detect an event of rain and rainfall, or the like.

The proximity sensor may send out a sensing signal in lateral and backward directions and receive a reflected signal from an obstacle such as another vehicle. The proximity sensor may sense the presence of the obstacle and detect a position of the obstacle based on a waveform of the received reflected signal. The proximity sensor may employ a method of detecting a distance from the obstacle by sending out ultrasound or infrared light and receiving reflected ultrasound or infrared light from the obstacle.

It is understood that the exterior of the vehicle 100 as described above and illustrated in FIG. 1 is provided merely for demonstration purposes, and thus does not limit the scope of the present disclosure.

Referring next to FIG. 2, an audio video navigation (AVN) terminal 25 that displays an image may be provided at a central region of a dashboard 26. The AVN terminal 25 may selectively display at least one of an audio screen, a video screen, and a navigation screen and also display various control screens related to the vehicle 100 or screens related to additional functions.

In addition, a jog shuttle type central input device 33 may be provided between a driver's seat 22L and a front passenger's seat 22R. The user may input a control command by turning, pressing, or pushing the central input device 33 upward, downward, leftward, or rightward. In addition, a gear stick 32 configured to control a gear level of the transmission 140 may be provided around the central input device 33.

In addition, the vehicle 100 may be provided with a speaker 23 configured to output sounds.

The speaker 23 may output sounds required to perform audio functions, video functions, navigation functions, and other additional functions.

Although the speaker 23 includes speakers 23L and 23R respectively provided at the driver's seat 22L and the front passenger's seat 22R in FIG. 2, the embodiment is not limited thereto and the speaker 23 may also be installed at various positions in the vehicle 100.

A steering wheel 27 may be provided on a dashboard 26 of the driver's seat 22L and a key slot 28 for insertion of a remote control device (not shown, e.g., FOB key) may be formed in an area adjacent to the steering wheel 27. When the remote control device to turn on/off the ignition of the vehicle 100 is inserted into the key slot 28 or authentication between the remote control device and the vehicle 100 is completed via a wireless communication network, an external terminal may be connected to the vehicle 100.

Also, the dashboard 26 may be provided with a start button 29 to control On/Off operation of the ignition of the vehicle 100. When the remote control device that controls the vehicle 100 is inserted into the key slot 28 or authentication between the remote control device and the vehicle 100 is completed via a wireless communication network, the user may turn on the ignition of the vehicle 100 by pressing the start button 29.

Meanwhile, the vehicle 100 may be provided with an air conditioner to perform both heating and cooling, and thus temperature inside the vehicle 100 may be adjusted by discharging heated or cooled air through an air vent 21.

Although the air vent 21 includes air vents 21L and 21R respectively provided at the driver's seat 22L and the front passenger's seat 22R in FIG. 2, the embodiment is not limited thereto and the air vent 21 may also be installed at various positions inside the vehicle 100.

It is understood that the exterior of the vehicle 100 as described above and illustrated in FIG. 1 is provided merely for demonstration purposes, and thus does not limit the scope of the present disclosure.

Figure 3:
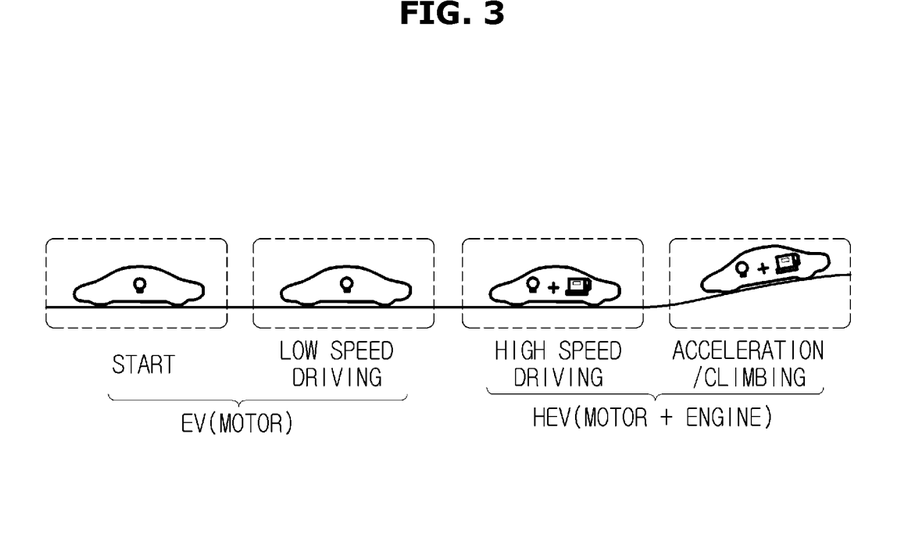
FIG. 3 is a diagram illustrating a driving mode of the vehicle according to embodiments of the present disclosure.

FIG. 3 is a diagram illustrating a driving mode of the vehicle 100 according to embodiments of the present disclosure.

As illustrated in FIG. 3, driving modes of the vehicle 100 may be classified into, for example, an electric vehicle (EV) driving mode in which the vehicle 100 is driven by a driving force of the motor 150 and a hybrid electric vehicle (HEV) driving mode in which the vehicle 100 is driven by driving forces of both the motor 150 and the engine 180.

The EV driving mode may include 'start' and 'low-speed driving'. The 'start' refers to a state in which the vehicle 100 starts to run for travelling from a stop state, and the 'low-speed driving' refers to a state in which the vehicle 100 runs in a relatively low speed.

Since a relatively low power is sufficient to drive the vehicle 100 during the 'start' and the 'low-speed driving' states, the vehicle 100 uses only the power of the motor 150 without using the power of the engine 180. However, the vehicle 100 may temporarily use only the power of the engine 180, if required, without using the power of the motor 150 in the HEV driving mode.

The HEV driving mode may include 'high-speed driving' and 'acceleration/climbing'. The 'high-speed driving' refers to a state in which the hybrid vehicle 100 runs at a relatively high speed. The 'acceleration/climbing' refers to a state in which the speed of the hybrid vehicle 100 gradually increases (i.e., acceleration) and the hybrid vehicle 100 climbs a hill. Since the 'high-speed driving' and the 'acceleration/climbing' require a relatively high power, the power of the engine 180 is required as well as the power of the motor 150.

The 'start' may be defined as a period of time from a stop state of the vehicle 100 to a state in which the vehicle 100 reaches a predetermined constant speed (e.g., 25 km/h).

A reference speed that distinguishes the 'low-speed driving' from the 'high-speed driving' may vary according to specifications of the vehicle 100. For example, when a maximum speed of the vehicle 100 that may be reached only using the power of the motor 150 may be determined as the reference speed, and a speed lower than the reference speed may be referred to as a low-speed and a speed higher than the reference speed may be referred to as a high-speed.

In the case where a maximum speed reachable only with the power of the motor 150 is 60 km/h, driving the vehicle 100 at a speed less than 60 km/h may be referred to as 'low-speed driving' and driving the vehicle 100 at a speed of 60 km/h or greater may be referred to as 'high-speed driving'.

Also, in case of 'acceleration/climbing', driving the vehicle 100 at an acceleration exceeding a predetermined value may be referred to as 'acceleration' and climbing up a slope with a predetermined angle or greater may be referred to as 'climbing'.

Since the vehicle 100 runs only with the driving force of the motor 150 in the EV driving mode and the vehicle 100 runs with the driving forces of both the motor 150 and the engine 180 in the HEV driving mode, the operation of the engine 180 is started when the driving mode is switched from the EV driving mode to the HEV driving mode.

Figure 4:
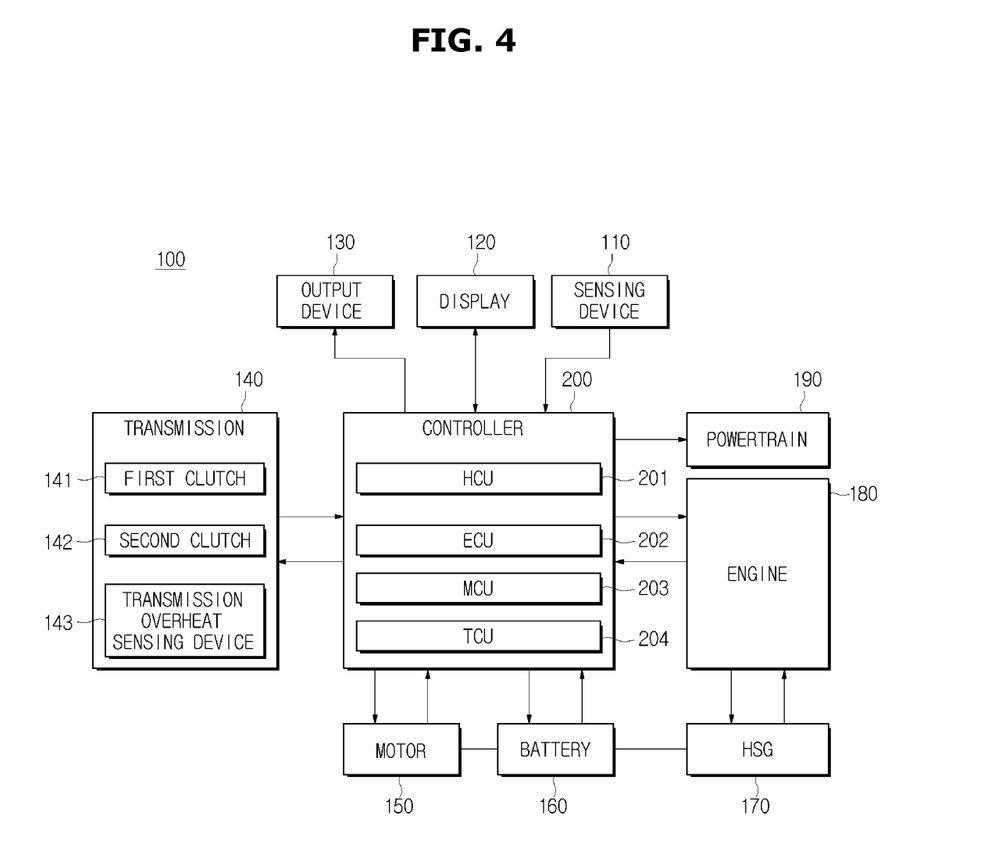
FIG. 4 is a block diagram illustrating elements of the vehicle according to embodiments of the present disclosure.

FIG. 4 is a block diagram illustrating some elements of the vehicle 100 according to embodiments of the present disclosure.

As shown in FIG. 4, the vehicle 100 may include a sensing device 110 (e.g., one or more sensors) configured to acquire driving information of the vehicle 100, a display 120 configured to provide or receive information on a driving mode change to or from a user, an output device 130 configured to audibly provide the user with information on the driving mode change when the driving mode is changed, a transmission 140 configured to convert the power into a required rotational force in accordance with a speed of the vehicle 100 and transmit the rotational force, a motor 150 configured to rotate by using electric energy, a battery 160 configured to store electric energy, a hybrid starter generator (HSG) 170 configured to start the ignition of the vehicle 100 or generate electric energy by operating as a power generator powered by an engine, an engine 180 configured to convert thermal energy to mechanical energy, a powertrain 190 configured to transmit the power generated by the engine 180, and a controller 200 configured to control each of the elements of the vehicle 100.

The sensing device 110 may acquire driving information of the vehicle 100 in real-time and transmit the acquired information to the controller 200.

Specifically, the sensing device 110 may acquire road information and traffic information on a road on which the vehicle 100 travels and transmit the information to the controller 200.

The driving information may include at least one of a traffic volume, a traffic type, the presence of a speed camera, a speed limit of the road on which the vehicle 100 travels, and a current speed of the vehicle 100.

The type of the road may include information on whether the road on which the vehicle 100 is currently traveling corresponds to an expressway, a national highway, an alley, a racing circuit, or an empty lot, and the traffic volume of the road may include information on the number of vehicles travelling on the road on which the vehicle 100 is currently travelling.

In addition, the driving information may further include information on a current speed of the vehicle 100, a speed limit of the road on which the vehicle 100 is currently travelling, and the presence of a speed camera on the road.

Thus, the sensing device 110 may include various sensors (not shown) to acquire driving information of the vehicle 100. Also, the sensing device 100 may receive road information and traffic information of the road on which the vehicle 100 is currently travelling from an external server by using the AVN terminal 25 of the vehicle 100 as well as the sensors and transmit the received information to the controller 200.

The display 120 (e.g., display screen) may display information on the driving mode of the vehicle 100 to the outside. Specifically, the display 120 may display information on the current speed, the current driving mode, the engine, and the motor of the vehicle. In addition, when the driving mode of the vehicle 100 is changed, the display 120 may inform the user of the changed driving mode.

Accordingly, the display 120 may include a display panel or display screen (not shown) to display the information, and the display panel may be implemented using a cathode ray tube (CRT) display panel, a liquid crystal display (LCD) panel, a light emitting diode (LED) panel, an organic light emitting diode (OLED) panel, a plasma display panel (PDP), a field emission display (FED) panel, or the like.

When the display 120 is implemented using a touch display, the display 120 may include a touch display panel (not shown) to receive input of the user.

When the driving mode of the vehicle 100 is changed, the output device 130 may inform the user of the changed driving mode.

Specifically, in the case where the driving mode of the vehicle 100 is changed, the output device 130 may inform the user of the changed driving mode via a speaker 23.

The transmission 140 may convert the power generated by the engine 180 and the motor 150 into a required rotational force in accordance with a speed and transmit the rotational force to the wheels.

In addition, the transmission 140 may include a first clutch 141 and a second clutch 142 that may be connected to the motor 150 and receive power from the motor 150. The transmission 140 may further include a transmission overheat sensing device 143 that determines an overheated state inside the transmission 140 by using a temperature sensor, a heat sensor, and the like. In addition, the transmission 140 may use a known dry or wet clutch.

The first clutch 141 and the second clutch 142 which are devices engaging/disengaging the motor 150 with/from the transmission 140 may transmit the power from the motor 150 to an axle.

The transmission 140 may be provided with the first clutch 141 and the second clutch 142 which may be linked to odd-numbered gears and even-numbered gears, respectively, via a clutch actuator to transmit or block the power of the motor 150.

In case of a six-speed transmission, the first clutch 141 is engaged with $1^{st}$, $3^{rd}$, and $5^{th}$ gears, and the second clutch 142 is engaged with $2^{nd}$, $4^{th}$, $6^{th}$ and R-gears. When the first clutch 141 is engaged with a certain gear (e.g., the first gear) and the vehicle 100 is running in the first gear, the second clutch 142 remains on standby in a state of being engaged with the next gear (e.g., second gear) before upshifting or downshifting. When the gear is shifted, the vehicle 100 may run in the next gear (e.g., second gear) by using the second clutch 142.

The transmission overheat sensing device 143 may sense temperatures of the first clutch 141 and the second clutch 142 by using a temperature sensor, a thermal sensor, and the like. In addition, upon determination that the sensed temperatures of the first clutch 141 and the second clutch 142 exceed preset temperature limits, i.e., the first clutch 141 and the second clutch 142 are in an overheated state by sensing temperatures of the first clutch 141 and the second clutch 142, the transmission overheat sensing device 143 may transmit information thereon to the controller 200 in the form of an electrical signal.

The controller 200 may control the overall operation of components of the vehicle 100.

Specifically, the controller 200 may include a hybrid control unit (HCU) 201, an engine control unit (ECU) 202, a motor control unit (MCU) 203, and/or a transmission control unit (TCU) 204.

The HCU 201 is a top-level controller configured to control driving of the other controllers, set the hybrid driving mode, and control the overall operation of the vehicle 100. The HCU 201 may be connected to the other controllers via high-speed CAN communication lines to exchange information therewith and perform cooperative control, thereby controlling output torques of the engine 180 and the motor 150.

The ECU 202 may control the overall operation of the engine 180 in accordance with a torque demand signal of the user and information on an engine state such as temperature of cooling water and engine torque.

The MCU 203 may control the overall operation of the motor 150 in accordance with a torque demand signal of the user, the hybrid driving mode, and a state of charge (SOC) of the battery 160.

The TCU 204 controls the overall operation of the transmission 140 by controlling a transmission ratio according to the output torque of each of the ECU 202 and the MCU 203, determining an amount of regenerative braking, and the like.

Hybrid systems including those described above are well known in the art, and thus detailed descriptions of each element will not be given. The controller 200 will be described as a generic name for the HCU 201, the ECU 202, the MCU 203, and the TCU 204.

The controller 200 may determine whether or not the driving mode of the vehicle 100 is changeable based on driving information received from the sensing device 110 and change the driving mode of the vehicle 100 to a mode corresponding to the driving information upon determination that the driving mode of the vehicle 100 is changeable.

The driving mode may include a "first mode" and a "second mode." The "first mode" refers to a state in which the vehicle 100 runs at a low-speed and the "second mode" refers to a state in which the vehicle 100 may run at a higher speed than the first mode. That is, when the vehicle 100 is currently running on a national highway or alley with may pedestrian crossings, a road with heavy traffic, a road with speed cameras, or a road with a low-speed limit which do not allow high-speed driving, the controller 200 may determine the driving mode of the vehicle 100 as the first mode.

However, when the vehicle 100 is currently running on an expressway, an empty lot, a racing circuit, a road with less traffic congestions, or a road with a high-speed limit which allows relatively high-speed driving, the controller 200 may determine the driving mode of the vehicle 100 as the second mode.

In addition, if the driving mode of the vehicle 100 is changeable, for example, from the first mode to the second mode or from the second mode to the first mode, the controller 200 may change the driving mode of the vehicle 100 to an available driving mode.

The controller 200 may also change the driving mode of the vehicle 100 by controlling at least one of the motor 150, the engine 180, the powertrain 190, and the transmission 140 of the vehicle 100.

Specifically, when the driving mode of the vehicle 100 is changed from the first mode to the second mode, the controller 200 may control at least one of the motor 150, the engine 180, the powertrain 190, and the transmission 140 of the vehicle 100 to allow the vehicle 100 to run faster at a higher speed.

Also, when the driving mode of the vehicle 100 is changed from the first mode to the second mode, the controller 200 may change entry requirements for the operation of the engine 180 to allow the driving mode of the vehicle 100 to be shifted to the HEV mode more quickly.

In general, a hybrid vehicle enters a HEV mode when a pressure applied to a pedal by the user is greater than a predetermined reference value. Thus, when the driving mode of the vehicle 100 is changed from the first mode to the second mode, the controller 200 may lower the reference value to allow the vehicle 100 to enter the HEV mode more quickly.

In addition, when the vehicle 100 is a parallel-type hybrid vehicle, the engine 180 or an engine clutch of the vehicle 100 may be maintained in a state of being connected to the axle of the vehicle 100. In this case, the engine 180 may immediately be driven upon a user's request for acceleration with respect to the power of the engine 180, and thus the speed of the vehicle 100 may be increased relatively quickly.

When the driving mode of the vehicle 100 is changed from the first mode to the second mode, the controller 200 may lower a gear level of the transmission. In the case of a vehicle equipped with a multi-stage transmission, shifting patterns affect performance of the vehicle. Thus, when the driving mode of the vehicle 100 is changed from the first mode to the second mode, the controller 200 may maintain the transmission at a low-gear level to allow the vehicle 100 to increase a speed more quickly.

In addition, when the driving mode of the vehicle 100 is changed from the first mode to the second mode, the controller 200 may improve responsiveness of the output torque of the powertrain 190 generated when the user operates the pedal. Since an amount of the torque output by the powertrain 190 is determined by the pressure applied to the pedal, the improvement of responsiveness may increase the amount of the torque generated by the powertrain 190 even when the user applies a relatively small force to the pedal. Thus, the speed of the vehicle 100 may be increased more quickly.

Although not shown in the drawing, the vehicle 100 may further include a storage device to store information on the vehicle 100.

Specifically, the storage device may store information set by the user for changing the driving mode together with information on length, height, width, and the like of the vehicle 100. The information is not deleted but stored in the vehicle 100 even after the power of the vehicle 100 is turned off (OFF).

Thus, the storage device may be implemented using at least one of non-volatile memory such as cache, Read Only Memory (ROM), Programmable ROM (PROM), Erasable Programmable Read Only Memory (EPROM), Electrically Erasable Programmable Read Only Memory (EEPROM), and flash memory, volatile memory such as Random Access Memory (RAM), and a storage medium such as Hard Disk Drive (HDD), and CD-ROM, without being limited thereto. The storage device may be a memory implemented as a separate chip from the processor described above with reference to the controller 200 or a single chip integrated with the processor.

Figure 5:
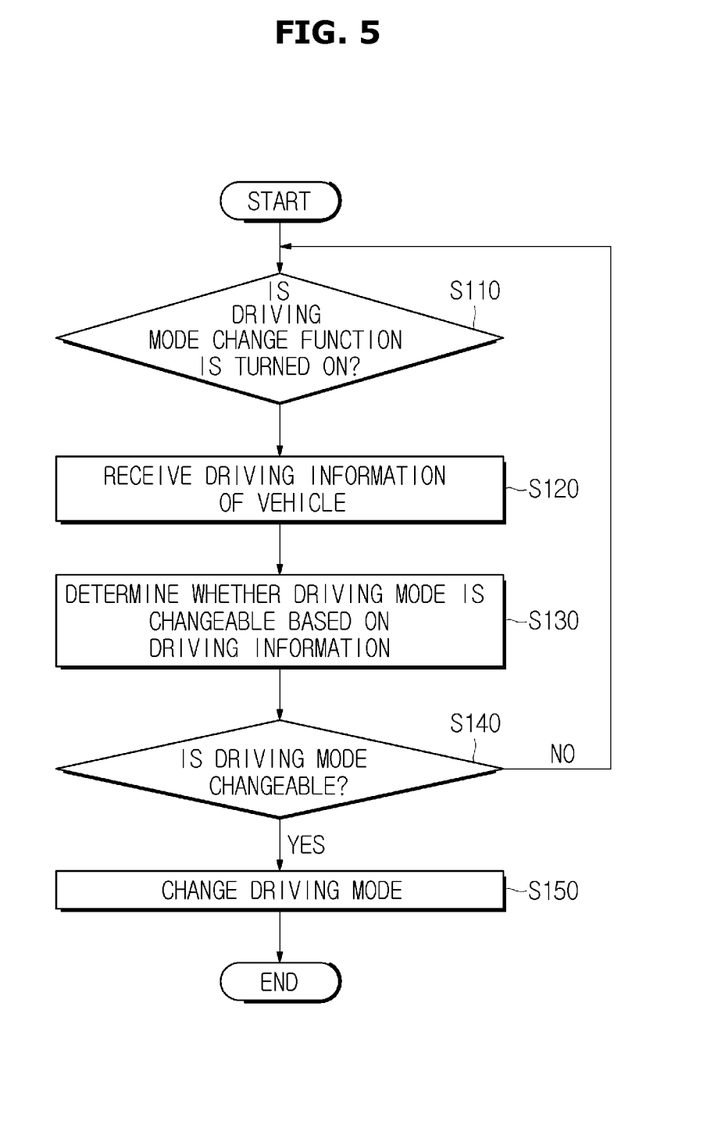
FIG. 5 is a flowchart illustrating a sequence of the operation of the vehicle according to embodiments of the present disclosure.

FIG. 5 is a flowchart illustrating a sequence of the operation of the vehicle 100 according to embodiments of the present disclosure.

As shown in FIG. 5, the vehicle 100 may determine whether or not a driving mode change function of the vehicle 100 is in an on-state (S110).

The driving mode change function is a function of automatically changing the driving mode in accordance with a driving environment of the vehicle 100, particularly, a function of switching the driving mode between the first mode and the second mode.

In addition, the driving mode change function may be applied only when the user preset. When the user does not preset the driving mode change function, i.e., when the driving mode change function is in an off-state OFF, the driving mode may not be changed even when requirements for the driving mode change are satisfied.

When the driving mode change function is turned on, driving information of the vehicle 100 may be received via various sensors and the AVN terminal 25 installed in the vehicle 100 (S120).

The driving information of the vehicle 100 may include at least one selected from a traffic volume, a traffic type, the presence of a speed camera, and a speed limit of the road on which the vehicle 100 travels and a current speed of the vehicle 100.

The type of the road may include information on whether the road on which the vehicle 100 is currently traveling corresponds to an expressway, a national highway, an alley, a racing circuit, or an empty lot, and the traffic volume of the road may include information on the number of vehicles travelling on the road on which the vehicle 100 is currently travelling. In addition, the driving information may further include information on a current speed of the vehicle 100, a speed limit of the road on which the vehicle 100 is currently travelling, and the presence of a speed camera on the road.

Further, behavior patterns of a floating population in an area may be analyzed to determine whether the dynamic driving is possible.

Upon receiving the driving information, whether or not the driving mode is changeable may be determined based on the received information (S130).

The driving mode includes a first mode in which the vehicle 100 runs at a relatively low-speed and a second mode in which the vehicle 100 runs at a relatively high-speed. The driving mode may be changed from the first mode to the second mode or from the second mode to the first mode. That is, in the case where the vehicle 100 runs in the first mode, when the driving mode is changeable to the second mode based on sensing results of the driving information, the driving mode may be changed to the second mode. On the contrary, in the case where the vehicle 100 is running in the second mode, when the driving mode is changeable to the first mode based on sensing results of the driving information, the driving mode may be changed to the first mode.

When the driving mode is changeable, the driving mode may be changed and various settings of the vehicle 100 may be controlled accordingly (S150).

Further, when the driving mode is changeable (when the driving mode change function is on), the driver is alarmed or informed of it.

A method of controlling various settings of the vehicle will be described with reference to FIG. 6.

Figure 6:
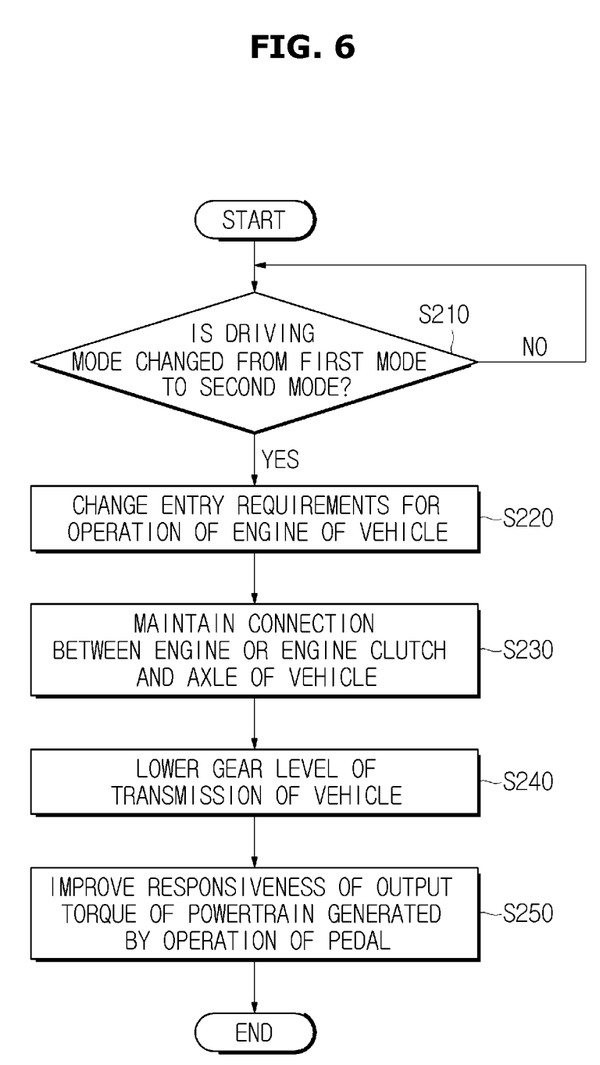
FIG. 6 is a flowchart illustrating a process of changing settings of the vehicle when a driving mode is changed according to embodiments of the present disclosure.

FIG. 6 is a flowchart illustrating a process of changing settings of the vehicle 100 when a driving mode is changed according to embodiments of the present disclosure.

As shown in FIG. 6, the vehicle 100 may determine whether or not the driving mode is changed from the first mode to the second mode (S210).

When the driving mode is changed from the first mode to the second mode, entry requirements for the operation of the engine 180 may be changed to allow the vehicle 100 to enter the HEV mode more quickly (S220).

In general, a hybrid vehicle enters a HEV mode when a pressure applied to a pedal by the user is greater than a predetermined reference value. Thus, when the driving mode of the vehicle 100 is changed from the first mode to the second mode, the reference value may be lowered to allow the vehicle 100 to enter the HEV mode more quickly.

In addition, when the vehicle 100 is a parallel-type hybrid vehicle, the engine 180 or the engine clutch of the vehicle 100 may be maintained in a state of being connected to the axle of the vehicle 100 (S230).

When the engine 180 or the engine clutch is maintained in a state of being connected to the axle of the vehicle 100, the engine 180 may immediately be driven upon a user's request for acceleration with respect to the power of the engine 180 to increase the speed of the vehicle 100 more quickly.

In addition, the vehicle 100 may lower the gear level of the transmission of the vehicle 100 (S240).

In the case of a vehicle equipped with a multi-stage transmission, gear shifting patterns affect performance of the vehicle. Thus, when the driving mode of the vehicle 100 is changed from the first mode to the second mode, the vehicle 100 may maintain the transmission at a low gear level to allow the vehicle 100 to increase the speed more quickly.

In addition, the vehicle 100 may manage the responsiveness of the output torque of the powertrain 190 generated by user's operation on the pedal (S250) so as to improve the responsiveness of the output torque.

Since an amount of the torque output by the powertrain 190 is determined by the pressure applied to the pedal, the improvement of responsiveness may increase the amount of the torque generated by the powertrain 190 even when the user applies a relatively small force to the pedal. Thus, the speed of the vehicle 100 may be increased more quickly.

Although FIG. 6 illustrates the operations S220 to S250 in series, embodiments of the present disclosure are not limited thereto. The operations S220 to S250 may also be operated simultaneously in parallel and the order of the operations S220 to S250 may also be modified.

While FIG. 6 has been described based on the case in which the driving mode is changed from the first mode to the second mode, a case in which the driving mode is changed from the second mode to the first mode may also be included therein. In this case, a method of controlling the vehicle 100 may be opposite to the method applied when the driving mode is changed from the first mode to the second mode.

The elements of the vehicle 100 and the method of controlling the same according to embodiments of the present disclosure have been described above.

In conventional systems for managing driving modes, the user needs to set the driving mode manually, making it inconvenient to change the driving mode.

However, the vehicle according to embodiments of the present disclosure may provide the user with more dynamic driving experience by automatically changing the driving mode based on driving information of the vehicle.

Although embodiments of the present disclosure are described herein, they are not limited the embodiments described above. Various other embodiments modified and changed by those of ordinary skill in the art based on the aforementioned embodiments may also be applied to the present disclosure. For example, even when the order of descriptions is changed, or the constituent elements such as systems, structures, devices, circuits, and the like are assembled or combined in a different manner from those described above and/or replaced or substituted by other constituent elements or equivalents, results, which are the same as or similar to those of the present disclosure, may be obtained.

As is apparent from the above description, the vehicle according to embodiments of the present disclosure may provide the user with more dynamic driving environments by automatically changing the driving mode based on driving information of the vehicle.

Although certain embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   an engine;
   a motor configured to transmit a rotational force to wheels of the vehicle;
   a first clutch and a second clutch configured to transmit power of at least one of the motor and the engine to an axle of the vehicle;
   a sensing device configured to acquire driving information of the vehicle; and
   a controller configured to determine whether a current driving mode of the vehicle is changeable based on the driving information, to identify a driving mode among a plurality of driving modes which corresponds to the driving information upon determining that the current driving mode is changeable, and to control an operation of the vehicle so as to change the current driving mode to the identified driving mode,
   wherein when the current driving mode is changed from a first mode to a second mode, the controller is configured to maintain a connection between the engine of the vehicle and the axle of the vehicle to transmit the power of the engine to the axle in response to an acceleration request of a user,
   wherein the driving information includes: a traffic volume, a traffic type, a presence of a speed camera, a speed limit of a road on which the vehicle travels, and a current speed of the vehicle, and
   wherein the second mode is a mode to drive at a faster speed than the first mode.

2. The vehicle of claim 1, wherein when the current driving mode is changed from the first mode to the second mode, the controller is further configured to control at least one of: the engine of the vehicle, the motor of the vehicle, a powertrain of the vehicle, and a transmission of the vehicle.

3. The vehicle of claim 2, wherein the controller is further configured to change an entry requirement for operation of the engine when the current driving mode is changed from the first mode to the second mode.

4. The vehicle of claim 2, wherein the controller is further configured to lower a gear level of the transmission when the current driving mode is changed from the first mode to the second mode.

5. The vehicle of claim 2, wherein the controller is further configured to manage a responsiveness of an output torque of the powertrain generated by operation of an accelerator pedal of the vehicle when the driving mode is changed from the first mode to the second mode.

6. The vehicle of claim 1, wherein the driving information includes at least one of: road information of a road on which the vehicle travels and traffic information of the road on which the vehicle travels.

7. The vehicle of claim 1, wherein the controller is further configured to change the current driving mode upon receiving a user's approval for changing the current driving mode.

8. The vehicle of claim 1, further comprising an output device configured to provide a user with information indicating a changed driving mode,
   wherein the output device includes a display screen configured to display the information indicating the changed driving mode when the current driving mode is changed.

9. A method of controlling a vehicle, the method comprising:
   acquiring, using a sensing device, driving information of the vehicle;
   determining, by a controller, whether a current driving mode of the vehicle is changeable based on the driving information;
   identifying, by the controller, a driving mode among a plurality of driving modes which corresponds to the driving information upon determining that the current driving mode is changeable; and controlling, by the controller, an operation of the vehicle so as to change the current driving mode of the vehicle to the identified driving mode, wherein the controlling of the operation of the vehicle to change the current driving mode comprises maintaining a connection between an engine of the vehicle and an axle of the vehicle to transmit the power of the engine to the axle in response to an acceleration request of a user when the current driving mode is changed from a first mode to a second mode, wherein the driving information includes: a traffic volume, a traffic type, a presence of a speed camera, a speed limit of a road on which the vehicle travels, and a current speed of the vehicle, and wherein the second mode is a mode to drive at a faster speed than the first mode.

10. The method of claim 9, wherein the controlling of the operation of the vehicle so as to change the current driving mode comprises controlling at least one of: the engine of the vehicle, a motor of the vehicle, a powertrain of the vehicle, and a transmission of the vehicle.

11. The method of claim 10, wherein the controlling of the operation of the vehicle so as to change the current driving mode comprises changing an entry requirement for operation of the engine when the current driving mode is changed from the first mode to the second mode.

12. The method of claim 10, wherein the controlling of the operation of the vehicle so as to change the current driving mode comprises lowering a gear level of the transmission when the current driving mode is changed from the first mode to the second mode.

13. The method of claim 10, wherein the controlling of the operation of the vehicle so as to change the current driving mode comprises managing a responsiveness of an output torque of the powertrain generated by operation of an accelerator pedal of the vehicle when the driving mode is changed from the first mode to the second mode.

14. The method of claim 9, wherein the driving information include at least one of: road information of a road on which the vehicle travels and traffic information of the road on which the vehicle travels.

15. The method of claim 9, wherein the controlling of the operation of the vehicle so as to change the current driving mode comprises changing the current driving upon receiving a user's approval for changing the current driving mode.

16. The method of claim 10, further comprising providing, by an output device, the user with information indicating a changed driving mode, wherein the output device includes a display screen configured to display the information indicating the changed driving mode when the current driving mode is changed.

* * * * *